(12) United States Patent
Sieh et al.

(10) Patent No.: US 11,052,342 B2
(45) Date of Patent: Jul. 6, 2021

(54) POCKET FILTER ELEMENT (71) Applicant: Carl Freudenberg KG, Weinheim (DE)

(72) Inventors: Maik Sieh, Sandhausen (DE); Felix Herberg, Heppenheim (DE); Hans Wiegand, Fuerth (DE)

(73) Assignee: CARL FREUDENBERG KG, Weinheim (DE)

(*) Notice: Subject to any disclaimer, the term of this patent is extended or adjusted under 35 U.S.C. 154(b) by 234 days.

(21) Appl. No.: 16/000,905

(22) Filed: Jun. 6, 2018

(65) Prior Publication Data
US 2019/0070544 A1    Mar. 7, 2019

(30) Foreign Application Priority Data

Sep. 7, 2017 (EP) .................................... 17189948

(51) Int. Cl.
  *B01D 46/02* (2006.01)
  *B01D 46/06* (2006.01)
  *B01D 46/00* (2006.01)

(52) U.S. Cl.
  CPC ..... *B01D 46/0002* (2013.01); *B01D 46/0001* (2013.01); *B01D 46/023* (2013.01); *B01D 2265/06* (2013.01)

(58) Field of Classification Search
  CPC ............ B01D 46/0001; B01D 46/0002; B01D 46/0005; B01D 46/02; B01D 46/06; B01D 46/023; B01D 2265/06
  USPC .............. 55/378, 379, 385.3, 485, 486, 528; 156/204, 227; 210/236, 283, 347, 435, 210/808
  See application file for complete search history.

(56) References Cited

U.S. PATENT DOCUMENTS

| 3,691,736 A | | 9/1972 | Neumann | |
| 4,080,185 A | * | 3/1978 | Richter | B01D 46/023 55/379 |
| 4,312,648 A | * | 1/1982 | Day | B01D 46/02 55/378 |
| 4,356,011 A | | 10/1982 | Day et al. | |
| 5,632,791 A | | 5/1997 | Oussoren | |
| 5,888,262 A | * | 3/1999 | Kahler | B01D 29/21 55/497 |
| 6,010,548 A | * | 1/2000 | Burkhead | B01D 46/02 156/204 |
| 6,524,359 B1 | * | 2/2003 | Kluge | B01D 46/0001 156/204 |
| 7,905,974 B2 | * | 3/2011 | Langlands | B01D 46/0005 156/244.11 |
| 10,512,867 B2 | * | 12/2019 | Donauer | B01D 46/521 |

(Continued)

FOREIGN PATENT DOCUMENTS

| CN | 206434967 U | 8/2017 |
| DE | 6908374 U | 7/1969 |

(Continued)

*Primary Examiner* — Minh Chau T Pham
(74) *Attorney, Agent, or Firm* — Leydig, Voit & Mayer, Ltd.

(57) ABSTRACT

A filter element includes: a frame having a peripheral elastomer body in which a reinforcement element is embedded; and a filter pocket. The frame is connected to an opening in the filter pocket with a connection established integrally by the elastomer body. In an embodiment, the elastomer body is molded on the filter pocket.

19 Claims, 4 Drawing Sheets (56) References Cited

U.S. PATENT DOCUMENTS

| | | | |
|---|---|---|---|
| 2003/0075500 A1* | 4/2003 | Kleingunther | B01D 29/012 |
| | | | 210/493.1 |
| 2009/0031682 A1* | 2/2009 | Langlands | B01D 46/0005 |
| | | | 55/378 |
| 2009/0078117 A1* | 3/2009 | Julch | B01D 46/02 |
| | | | 96/154 |
| 2009/0107088 A1* | 4/2009 | Sundvik | B01D 46/02 |
| | | | 55/350.1 |
| 2010/0058721 A1 | 3/2010 | Wu | |
| 2014/0237957 A1* | 8/2014 | Kohn | B01D 46/023 |
| | | | 55/341.1 |
| 2015/0128540 A1* | 5/2015 | Eyers | B01D 46/023 |
| | | | 55/379 |
| 2018/0221802 A1* | 8/2018 | Weisbach | B01D 46/0016 |
| 2018/0280853 A1* | 10/2018 | George | B01D 46/0005 |

FOREIGN PATENT DOCUMENTS

| | | | | |
|---|---|---|---|---|
| DE | 9103538 U1 | 6/1991 | | |
| DE | 202008006834 U1 | 8/2008 | | |
| DE | 102014004810 A1 * | 10/2015 | | B01D 46/06 |
| WO | 2011133098 A1 | 10/2011 | | |

\* cited by examiner

POCKET FILTER ELEMENT

CROSS-REFERENCE TO PRIOR APPLICATION

Priority is claimed to European Patent Application No. EP 17 189 948.7, filed on Sep. 7, 2017, the entire disclosure of which is hereby incorporated by reference herein.

FIELD

The invention relates to filter elements, comprising a frame and a filter pocket, the frame comprising a peripheral elastomer body in which a reinforcement element is embedded, the frame being connected to the opening in the filter pocket and the connection being established integrally by means of the elastomer body. The invention also relates to a method for producing filter elements, to the use thereof and to apparatuses comprising the filter elements.

BACKGROUND

Filter elements of the mentioned kind are generally referred to as pocket filters. They are used to filter fluids, in particular air. For this purpose, the filter elements are typically inserted into filter housings. In order to ensure efficient filtration, both the connection between the filter pocket and the frame within the filter element and the connection between the frame of the filter element and the filter housing must have a high level of fluid tightness. Additional seals are typically used to ensure said fluid tightness. It is also common to adhesively bond the filter pocket to the frame. In order to ensure efficient filtration, the fluid to be filtered also has to flow through as large an area of the filter material as possible. However, in particular at low rates of flow, the filter pocket may collapse, meaning that the area of the filter through which fluid flows is significantly reduced and the filtration is far less efficient.

The prior art attempts to solve the stated problems in a number of ways.

DE 6908374 U discloses a pocket filter element comprising a plurality of filter pockets in individual housings which are fused into a filter frame. The individual filter pockets are formed by a supporting body into which a filter mat is inserted, which is pressed against supporting body by means of a clamping frame in order to provide sealing. However, since the filter material is force-locked to the frame structure, leaks may in principle arise at the contact points. Although the disclosed structure prevents the pocket from collapsing at low rates of flow, it is structurally very complex as a multiplicity of metal parts have to be joined together. In order to ensure that the disclosed filter unit is installed into a filter housing in a fluid-tight manner, an additional seal has to be placed on the frame of the filter element.

WO 2011/133098 A1 also discloses pocket filter elements comprising a plurality of filter pockets. The filter pockets are clamped between two auxiliary frames and a carrier frame. The filter pockets are interconnected by means of a clamping strip. However, since the filter material is force-locked to the frame structure, leaks may in principle arise at the contact points. Furthermore, in the case of the disclosed structure, at least three different frame parts are required, which have to be assembled in a plurality of steps and make it accordingly more complex to assemble the filter element. The filter pockets are not prevented from collapsing at low rates of flow by the disclosed structure.

DE 20 2008 006 834 U1 discloses pocket filter elements having a plurality of filter pockets and a frame made of polyurethane, into which frame a strengthening element made of metal is embedded for reinforcement. The filter element is connected to the polyurethane frame by being foamed on, so as to bring about a fluid-tight connection between the frame and a filter pocket. The drawback to this is that the production method is relatively complex as the frame has to be produced by embedding the strengthening element in the polyurethane in a first step and foaming the filter pocket on the frame in a further step. Another drawback is that an additional material is required for foaming. In the filter pockets, spacers may be arranged on both sides or alternating sides on each wall of the filter pocket, as a result of which the filter pockets are intended to be prevented from caving in. The spacers are connected to the walls of the filter pocket by means of fused or adhesive connections. However, a drawback to the filter pockets is that the spacers have to be adhesively bonded or fused to the walls of the filter pocket in an additional production step.

U.S. Pat. No. 4,356,011 discloses pocket filter elements having a plurality of filter pockets. Stays made of filter material are stitched into the filter pockets, which stays connect the walls within the individual filter pockets and thus stabilize the shapes of the filter pockets and prevent the individual filter pockets from touching one another. However, the corresponding shape is dependent on the fluid flow and therefore does not solve the problem of the filter pockets collapsing at low rates of flow. Furthermore, stitching the stays to the walls of the filter pocket represents an additional and complex production step.

In general, the drawback to the prior art is therefore that a high level of structural complexity is required to ensure a fluid-tight connection between the filter pockets and the frame structure by clamping the said pockets to said structure. Alternatively, the filter pocket may be adhesively bonded to or foamed on the frame in an additional production step. In order to prevent the filter pockets from collapsing at low rates of flow, solutions also requiring additional production steps are proposed. Furthermore, a drawback to the pocket filter elements disclosed in the prior art is that, in order to seal the connection between the frame of the pocket filter element and the filter housing in which the pocket filter element is installed, an additional seal element is required to ensure fluid-tight installation and thus efficient filtration.

SUMMARY

In an embodiment, the present invention provides a filter element, comprising: a frame comprising a peripheral elastomer body in which a reinforcement element is embedded; and a filter pocket, wherein the frame is connected to an opening in the filter pocket with a connection established integrally by the elastomer body.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Filter elements are intended to be provided in which the filter pocket is prevented from collapsing at low rates of flow.

The filter elements are intended to be obtainable by means of a simple and efficient production method which requires as few working steps and different materials as possible.

The invention relates to a filter element, comprising a frame and a filter pocket, the frame comprising a peripheral elastomer body in which a reinforcement element is embedded, the frame being connected to the opening in the filter pocket, the connection being established integrally by means of the elastomer body. The filter element within the meaning of the present invention makes it possible to separate substances from fluids, in particular particles or liquids from gases.

A frame within the meaning of the present invention is a rim which surrounds the opening. The opening in the frame corresponds to the opening in the filter pocket which is attached to the frame and is kept open and stabilized by said frame. During filtration, the fluid to be filtered flows through the opening formed by the frame into or out of the filter pocket.

Filter pockets within the meaning of the invention are elements made of a porous filter material which are open on one side. The filter material comprises, at one end, an opening through which the fluid to be filtered flows, and an opposite end at which the filter pocket does not have an opening, i.e. is closed. The filter pockets do not have any other openings in the filter material. The fluid may flow through the opening in the filter, flow out through the filter material at the closed end, and be filtered in the process. Alternatively, the fluid may flow into the filter at the closed end, be filtered in the process, and flow towards the opening (reverse operation). The fluid preferably flows in through the opening and out through the filter pocket at the closed end.

A peripheral elastomer body within the meaning of the present invention is a molded body which contains or consists of an elastic polymer and which extends over the entire periphery of the frame. The shape of the elastomer body thus corresponds to the shape of the frame and has a central opening through which the fluid that is to be filtered or has been filtered flows during filtration.

A reinforcement element within the meaning of the present invention is an element which stabilizes and/or reinforces the frame in the plane of the opening in the filter element. The outer periphery of the reinforcement element corresponds to the shape of the frame. The reinforcement element preferably extends around the periphery of the opening in the filter pocket, in the same way as the frame does. The reinforcement element may be either completely or in part embedded in the elastomer body. The term "embed" means that the elastomer body surrounds the reinforcement element at least in part, and thus does not merely rest thereon.

Integral connections within the meaning of the present invention are irreversible connections between various elements, said elements being held together by atomic and/or molecular forces. Integral connections can only be released by destroying the object resulting from the connection.

The filter elements combine several significant advantages. The integral connection between the frame and the filter pocket by means of the elastomer body makes it possible for said elements to be connected in an optimally fluid-tight manner. Furthermore, the connection has a particularly high level of stability and thus prevents the filter pocket from detaching from the frame at high rates of flow of the fluid to be filtered. Furthermore, additional material, for example adhesives or clamps, is advantageously not required to connect the frame and the filter pocket. The disclosed filter elements are therefore comparatively simple and cheap to produce.

The filter elements also have the advantage that the elastic properties of the frame make it possible to connect the filter element to a mating piece, such as a filter housing, in a highly fluid-tight manner. When the filter elements according to the invention are pressed against the filter housing, gaps and other leaks are prevented by elastically adjusting the frame of the filter elements to the mating piece of said elements. In contrast to the filter elements from the prior art, no additional elastic seal element between the filter element and the filter housing is needed for this purpose.

In a preferred embodiment, the elastomer body is molded on the filter pocket. During the molding, the frame consisting of the reinforcement element and the elastomer body is preferably produced simultaneously. In this process, the elastomer body is molded on the filter pocket such that the reinforcement element is simultaneously embedded in the elastomer body. By the elastomer body being molded on the filter pocket, an integral connection having the above-mentioned advantages can be formed in a single, simple method step.

The elastomer body of the filter elements contains or consists of at least one elastomer. The elastomer may be selected, for example, from the group comprising polyurethanes, polyesters, polyamides, polyolefins, polyacrylates, polystyrenes, natural and synthetic rubbers, or mixtures thereof. The elastomer may be a homopolymer or a copolymer. The copolymer may be selected, for example, from the group comprising acrylonitrile/butadiene/acrylate copolymers, acrylonitrile-chlorinated polyethylene/styrene copolymers, acrylonitrile/methyl methacrylate copolymers, ethylene/ethyl acrylate copolymers, styrene/butadiene/styrene copolymers, vinyl chloride/ethylene copolymers and vinyl chloride/ethylene/methacrylate copolymers. The synthetic rubber may be selected, for example, from the group comprising butadiene rubber, butyl rubber, chloroprene rubber, ethylene/propylene/diene rubber, fluororubber, isoprene rubber, natural rubber, polyurethanes, silicone rubber and styrene/butadiene rubber. In alternative embodiments, the elastomer body may contain a mixture of a plurality of different elastomers and/or copolymers thereof. The elastomer may be a molded or foamed elastomer.

The elastomer is preferably a polyurethane and thus contains no other polymer components. In a preferred embodiment, the elastomer body contains at least one polyurethane as an elastomer. In a preferred embodiment, the polyurethane is a two-component polyurethane which is formed by reacting at least one organic diisocyanate with a long-chain polyol.

Aliphatic, cycloaliphatic, araliphatic, heterocyclic and aromatic diisocyanates, for example, are possible organic diisocyanates for producing the polyurethanes. For example, aliphatic diisocyanates, such as hexamethylene diisocyanate, cycloaliphatic diisocyanates, such as isophorone diisocyanate, 1,4-cyclohexane diisocyanate, 1-methyl-2,4- and -2,6-cyclohexane diisocyanate, 4,4'-, 2,4'- and 2,2'-dicyclohexylmethane diisocyanate, aromatic diisocyanates, such as 2,4-toluene diisocyanate or 3,3'-dimethyl-4,4'-biphenyl diisocyanate or 1,4-phenylene diisocyanate, 2,4- and 2,6-toluene diisocyanate, diphenylmethane diisocyanates, such as 4,4'-diphenylmethane diisocyanate, 2,4'-diphenylmethane diisocyanate and 2,2'-diphenylmethane diisocyanate, 2,4'-diphenylmethane diisocyanate and 4,4'-diphenylmethane diisocyanate, urethane-modified, liquid 4,4'-diphenylmethane diisocyanates and/or 2,4'-diphenylmethane diisocyanates, 4,4'-diisocyanatodiphenylethane-(1,2) and 1,5-naphthylene diisocyanate or a mixture of the stated compounds.

The polyol may be selected from at least one polyol from the group comprising polycarbonates, polyesters, polyethers or a mixture of the stated compounds. The polyol may have a molecular weight of from 500 g/mol to 5,000 g/mol. Polyols having a molecular weight of from 1,000 g/mol to 3,000 g/mol are preferably used, and polyols having a molecular weight of from 1,500 g/mol to 2,500 g/mol are particularly preferably used.

The diisocyanates form, optionally together with short-chain diols or diamines as chain lengtheners, the hard segments of the elastomer. The long-chain polyols form the soft segments of the elastomer. The elastic properties of the polyurethanes are determined by the ratio of hard to soft segments, a higher proportion of soft segments increasing the elasticity. Furthermore, the elasticity of the soft segments increases as the length of the soft segments does.

In a further preferred embodiment, the polyurethane may be a foamed or molded polyurethane.

The stated polyurethanes have the advantage that they have good elastic properties, good adhesive properties for integrally connecting the elements of the filter element, and good moldability.

The elastomer used may preferably be a soft polymer, preferably a soft polyurethane. The softness of polymers can be characterized by their Shore hardness. The elastomer contained in the elastomer body may have a Shore hardness A of from 10 to 50, preferably from 20 to 40, particularly preferably from 25 to 35. The elastomer may have a Shore hardness A of from 15 to 35, from 20 to 40, and from 25 to 50. The elastomer may have a Shore hardness A of less than 60, less than 55, less than 50, less than 45, less than 40, less than 35, or less than 30. In an especially preferred embodiment, the elastomer has a Shore hardness A of 28. The Shore hardness A can be determined as per DIN ISO 7619-1. Elastomers of the stated softness have the advantage that they make it possible to connect the frame to the filter pocket of the filter element, and/or the frame of the filter element to a filter housing, in a particularly fluid-tight manner, without the need for additional seal elements.

The elastomer body may be at least in part in the form of a peripheral sealing lip, the radial sealing of the filter element thus advantageously being improved. Furthermore, the elastomer body may comprise a compensation groove in the outer region of the frame. The compensation groove can advantageously reduce restoring forces. In particular, the combination of the sealing lip and the compensation groove makes it possible to assemble the filter element so as to be leak-free and highly fluid-tight.

At least one reinforcement element is embedded in the elastomer body of the frame such that the frame is prevented from bending in typical operating conditions. This is advantageous in that the frame is stabilized without the elastic properties of the frame that are advantageous for the use of the filter element being limited. Stabilizing the frame prevents the frame from bending, and thus prevents potential leaks between the frame of the filter element and a filter housing.

The reinforcement element is preferably embedded in the elastomer body over the entire periphery of the frame. The outer shape of the reinforcement element thus corresponds to the shape of the frame. The reinforcement element may be completely or in part surrounded by the elastomer body. In a preferred embodiment, the reinforcement element is surrounded only in part by the elastomer body. In a particularly preferred embodiment, the reinforcement element is surrounded by the elastomer body in an installation direction, for example in the flow direction of the fluid. In the installation direction of the filter element, said element rests against a part of an apparatus, such as a filter housing, when in use.

The reinforcement element may contain or consist of at least one metal and/or at least one thermoplastic and/or at least one thermosetting plastic. The material is selected such that the reinforcement element has sufficient hardness and strength in order to ensure the structure of the frame in typical operating conditions. In this respect, the reinforcement element is stiff, i.e. not elastic, in a preferred embodiment. The thermoplastic may be selected, for example, from the group comprising polystyrenes, polyamides, polybutylene terephthalates, polybutylene terephthalates, polycarbonates, polyesters, polyetherimides, polyetherketones, polyethylenes, polyethersulfones, polyethylene terephthalates, polyimides, polyvinyl chlorides, or the group of copolymers comprising styrene/acrylonitrile copolymers, acrylic ester/styrene/acrylonitrile copolymers, acrylonitrile/butadiene/styrene copolymers, cyclic olefin copolymers, ethylene/propylene copolymers, fluorinated ethylene propylenes. Preferred thermoplastics are acrylonitrile/butadiene/styrene copolymers. The thermosetting plastic may be selected, for example, from the group comprising epoxy resins, urea/formaldehyde resins, melamine/formaldehyde resins, melamine/phenol formaldehydes, phenol/formaldehyde resin or polyesters.

In a preferred embodiment, thermoplastic elastomers (TPE) are used as thermoplastics. Said elastomers combine the properties of rubber with those of thermoplastics. TPE is soft like rubber, but can be plastically deformed by applying heat, thus making it possible to process by means of injection molding, such as multiple-component injection molding, in particular two-component injection molding, and extrusion. Thermoplastic elastomers (TPE) contain two phases, the hard phase of which is responsible for melting and the soft phase of which is responsible for the elastomer-like character. TPEs are not generally chemically cross-linked, but rather have, in regions, physical crosslinking points (secondary valency forces or crystallites) which break when subjected to heat, without the macromolecules breaking down. Thermoplastic elastomers are particularly preferred if the filter element is produced by means of injection molding.

In a further particularly preferred embodiment, the frame of the filter element comprises at least one, preferably a plurality of, spacer elements which project into the filter pocket. Said spacer elements are designed such that they prevent the opposite walls of the filter pocket from possibly touching one another. The spacer elements are thus also designed such that they prevent the filter pocket from collapsing at a low rate of flow. If the filter pocket collapses, the opposite walls of the filter pocket touch one another in part, possibly stick together, as a result of which the affected filter area is no longer able to efficiently contribute to the filtering performance of the filter pocket. The efficiency of filtration therefore drops.

By the filter pocket being prevented from collapsing at low rates of flow, the entire area of the filter pocket can advantageously be utilized for filtration even at a low rate of flow. In these conditions, effective filtration is thus ensured and the filtered substances are prevented from being deposited unevenly in the filter material. The collapsing of the filter pocket is preferably stabilized at rates of flow of less than 300 m3/h, in particular less than 100 m3/h, and for example at approximately 30 m3/h. In a preferred embodiment, the filter pocket is also prevented from collapsing if the fluid to be filtered flows through the filter element from the closed end of the filter pocket towards the open end of the filter pocket. An operation of this kind is generally referred to as "reverse operation".

The spacer elements are connected to the filter material in the region of the filter pocket in a preferably non-direct manner, in particular not by means of integral connections, such as fusion or bonding.

The spacer elements may preferably be in the form of elongate, rib-shaped connecting pieces or bars. The spacer elements project from the frame into the filter pocket and extend from the open end of the filter pocket towards the rear end of the filter pocket. The spacer elements may interconnect two sides or corners, in particular opposite sides and adjacent corners, of the frame. The spacer elements therefore advantageously also contribute to the stabilization of the frame.

The spacer elements may have a cross section which is straight or at least in part curved. In a specific embodiment, a spacer element may have a circular or elliptical cross section, the spacer element being connected to the frame at opposite points of the circular cross section in this embodiment.

The spacer elements and the reinforcement element may be formed in one piece or integrally or interlockingly interconnected. The mentioned types of connection have the advantage of a particularly stable connection. The spacer element and the reinforcement element are particularly preferably formed in one piece. In particular, this is advantageous in that these parts can be produced in one production step and the joining of the parts as an additional production step is omitted.

In a preferred embodiment, the spacer elements taper towards the rear end of the filter pocket. In a further preferred embodiment, the spacer elements are rounded towards the rear end of the filter pocket. As a result, the filter pockets can be prevented from being damaged on corners of the spacer elements. In a preferred embodiment, the spacer elements taper towards the rear end of the filter pocket at least in regions. In order to facilitate assembly, the reinforcement element may preferably comprise curved rib-shaped connecting pieces which connect two opposite corners of the reinforcement element. Said rib-shaped connecting pieces are preferably rounded towards the rear end of the filter pocket and end flush with the corners of the reinforcement element. This design of the spacer elements makes it easier to place the filter pocket over the spacer elements and the reinforcement element when the filter elements are assembled, meaning that no tool is needed for this step.

In an alternative embodiment, in the case of an interlocking connection between the frame and the spacer elements, the spacer elements may also be first connected to the frame just before the filter element is used. As a result, the packaging and transport volume of the filter element is advantageously reduced. In order for the frame and a spacer element to be interlockingly connected, these parts may comprise corresponding elements. For example, the frame may comprise a groove, and the spacer element may comprise a corresponding spring. Alternatively, the frame and the spacer elements may comprise other elements which allow these parts to be latched to one another or otherwise interlocked.

In a further preferred embodiment, the spacer elements may be movable. In this case, said elements are preferably foldable, i.e. can be folded away or folded out. For this purpose, said elements comprise a folding device, for example a joint or hinge, in particular a living hinge. In this case, said elements may be connected to the frame by means of the folding device. The spacer elements can thus be folded away, preferably towards the frame, in particular in order to save space. This is advantageous if the filter element is not being used as intended, such as when it is stored, transported and/or packaged. Spacer elements can thus be folded away for packaging and transport and folded out before the filter element is used.

In a particularly preferred embodiment, the filter pocket comprises at least one nonwoven. The nonwoven preferably consists of fibers made of artificial polymers. In a preferred embodiment, the fibers are of the kind made of organic polymers. In a further preferred embodiment, the nonwoven contains or consists of inorganic fibers, for example glass fibers. The nonwoven is the filter material and brings about the filtration of the fluid. The filter pocket of the filter element may comprise a progressive filter material. In this case, the density of the filter material increases over the cross section of the filter material. The filter material may also consist of a plurality of layers of material.

The filter material of the filter pocket may preferably be a coalescing filter, in particular a filter material that is suitable for removing water from gases. Filters of this kind are particularly suitable for removing water when air supplied to an engine is filtered. The filter material may also be suitable for removing particles and dust, in particular particles of substances which are harmful to health, such as fertilizers, herbicides or insecticides.

In a preferred embodiment, the filter element comprises just a single filter pocket. The filter element may comprise a plurality of filter pockets, for example two, three, four or more filter pockets. Embodiments having 2 to 20, in particular having 5 to 15 or 6 to 12 filter pockets are also preferred.

Figure 1:
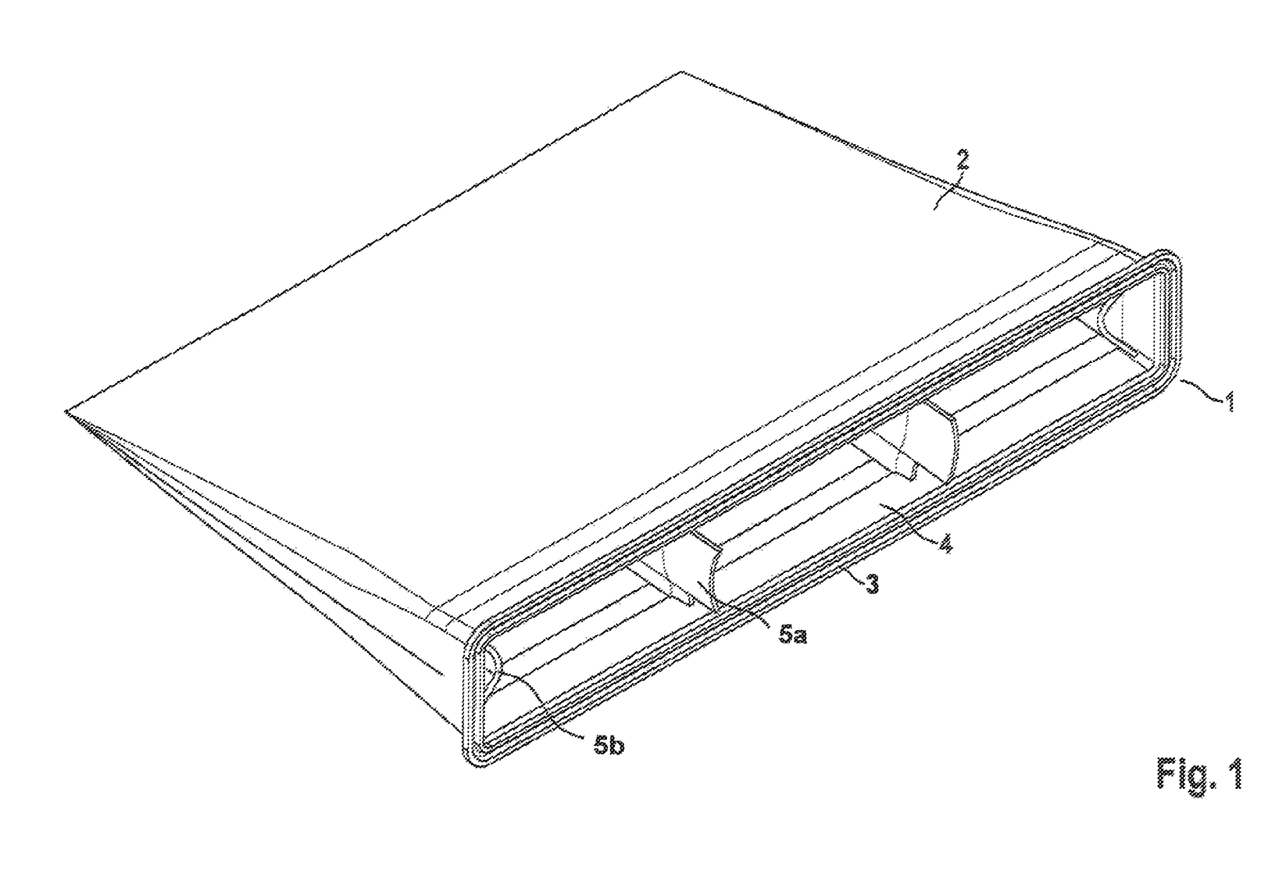
FIG. 1 shows a filter element according to the invention, with a view of the frame and the filter pocket.
Figure 2:
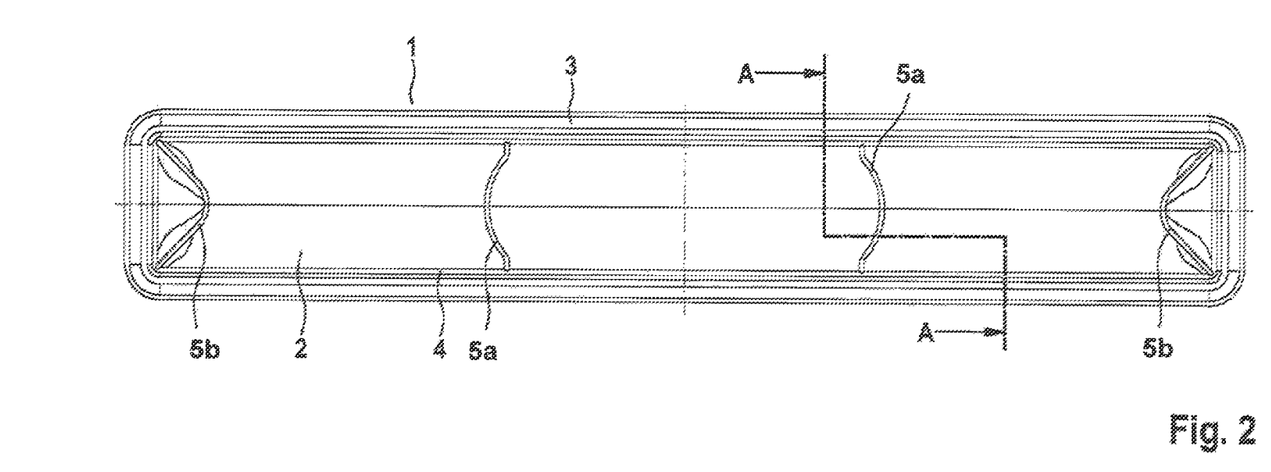
FIG. 2 shows the filter element in the throughflow direction.

As shown in FIG. 1 and FIG. 2, the disclosed filter element comprises a frame 1 and a filter pocket 2, the frame 1 comprising a peripheral elastomer body 3 in which a reinforcement element 4 is embedded. The frame 1 is connected to the opening in the filter pocket 2 and comprises the opening in the filter element. The outside of the reinforcement element 4 is encompassed in part by the filter pocket 2. The filter pocket 2 tapers from the open end towards the closed end. The connection between the filter pocket 2 and the frame 1 is established integrally by means of the elastomer body 3. The connection between the elastomer body 3 and the reinforcement element 4 is also established integrally. Here the elastomer body 3 surrounds both the reinforcement element 4 and the filter pocket 2 on the outside of the frame 1.

Figure 3A:
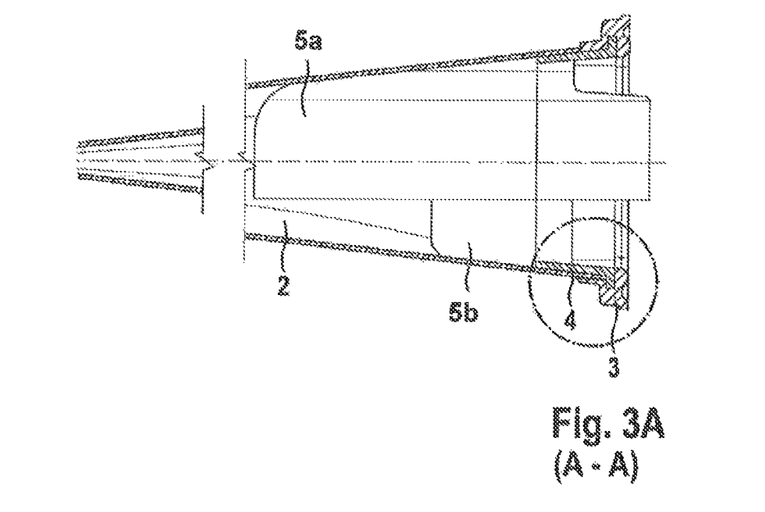
FIG. 3A is a section through a filter element along the line A-A from FIG. 2, with a view of the spacer elements.

The filter element comprises spacer elements 5a, 5b which project into the filter pocket 1. In FIG. 1 and FIG. 2, the spacer elements 5a, 5b are designed as rib-shaped connecting pieces. Some of said connecting pieces are arranged 5a centrally within the frame and interconnect the opposite sides of the frame. The connecting pieces in the embodiment shown are in part curved and formed in one piece with the reinforcement element 4. As shown in FIG. 3A, the spacer elements 5a are rounded towards the rear end of the filter pocket 1 and taper widthways. The spacer elements 5a, 5b are designed such that they prevent the filter pocket from collapsing at a low rate of flow.

Furthermore, the filter element shown in FIG. 1 and FIG. 2 comprises spacer elements 5b which are arranged at the side and each of which interconnect two adjacent corners of the frame. The spacer elements arranged at the side are also rounded towards the rear end of the filter pocket. The spacer elements 5a, 5b are arranged within the reinforcement element 4 such that said spacer elements make it easier to place the filter pocket 1 over the reinforcement element 4 when the filter element is assembled.

The two opposite longer sides of the frame 1 may have, for example, a length of from 10 cm to 100 cm, from 20 cm to 80 cm, or from 30 cm to 60 cm. The two opposite short sides of the frame may have, for example, a length of from 3 cm to 30 cm, from 4 cm to 15 cm, or from 6 cm to 10 cm.

FIG. 3A is a section through the filter element along the line A-A from FIG. 2, with a view of the spacer elements 5a, 5b. The spacer elements 5a, 5b taper towards the rear end of the filter pocket and are formed in one piece with the reinforcement element 4.

Figure 3B:
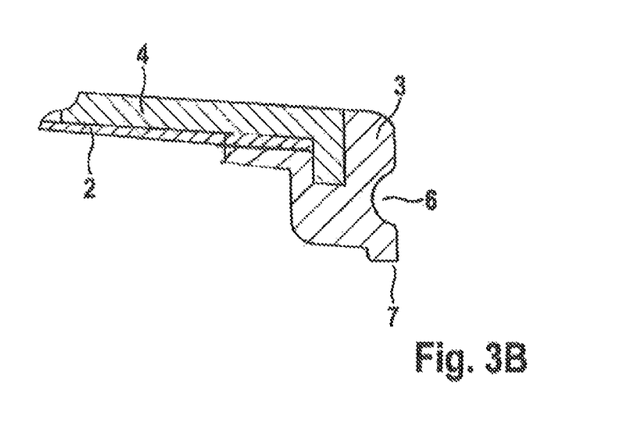
FIG. 3B shows the circled region from FIG. 3A in detail.

In FIG. 3B, the circled part of the section through the frame of the filter element in FIG. 3A can be seen in detail. In particular, it can be seen in FIG. 3B that the shown embodiment of the filter element comprises, in the outer region of the frame, a peripheral compensation groove 6 which reduces restoring forces when the filter element is being assembled. Furthermore, the filter element comprises a peripheral sealing lip 7 in the outer region of the frame. In particular the combination of the compensation groove 6 and the sealing lip 7 makes it possible to assemble the filter element so as to be leak-free.

Figure 4:
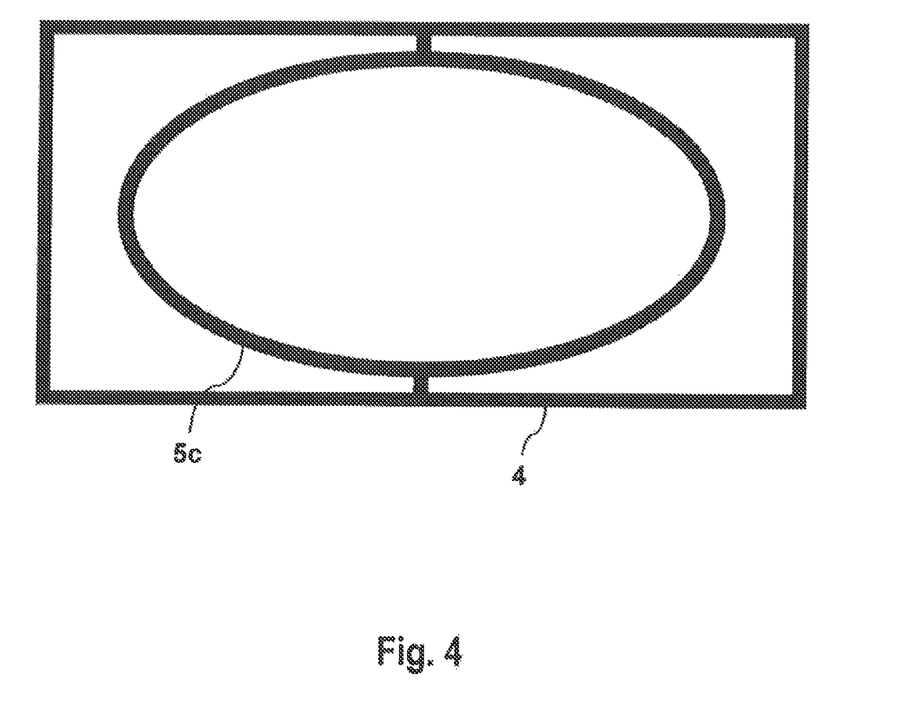
FIG. 4 is the cross section of a reinforcement element in the throughflow direction together with a circular spacer element.

The spacer element may be made of a punched metal part, as shown in FIG. 4 by way of example. In this case, a spacer element 5c is connected to a frame 4 in a plane. The spacer element 5c may be curved in a desired direction away from the plane of the frame.

The invention also relates to a method for producing a filter element, comprising the steps of:
a) introducing part of the filter pocket comprising the opening therein, and introducing the reinforcement element or a precursor compound for the reinforcement element, into a molding die, optionally followed by hardening and/or polymerizing the precursor compound so as to form the reinforcement element,
b) introducing at least one elastomer precursor compound into the molding die, and
c) hardening and/or polymerizing the elastomer precursor compound so as to form the elastomer body, which, together with the reinforcement element, thus forms the frame, which is integrally connected to the opening in the filter pocket by means of the elastomer body.

In step a), a pre-made reinforcement element may be used. Alternatively, step a) may take place such that the reinforcement element, i.e. the corresponding molded body, is first made from a precursor compound in the molding die. This takes place in particular by means of molding, in particular injection molding, and subsequent hardening and/or polymerizing. As early as this stage, a connection between the reinforcement element and the filter pocket is preferably established in the process.

Steps a) and b) may be carried out in any desired sequence. The shape of the molding die corresponds substantially to the outer shape of the filter element or part thereof, in particular of the elastomer body and optionally also the reinforcement element. In step a), the part of the filter pocket comprising the opening is placed in the molding die. The part of the filter pocket which is intended to be used for filtration in the product is not introduced into the molding die, or is at least not provided with elastomer. The part of the filter pocket comprising the opening is connected to the reinforcement element. The filter pocket can thus be placed over the pre-made reinforcement element such that said pocket surrounds the reinforcement element on the outer edge. The spacer elements make it easier to place the filter pocket over the pre-made reinforcement element and to attach these parts to one another such that this step can also take place without tools.

The elastomer precursor compound introduced into the molding die in step b) is typically in a liquid state. Said compound can be poured or injected into the die. Foaming may also take place simultaneously while said compound is being introduced. By means of a physical or chemical reaction, the precursor compound is converted to a solid elastomer body.

The elastomer precursor compound is preferably selected from compounds which polymerize to form an elastomer by reacting with one another, such as when diisocyanates react with polyols to form polyurethanes. In order to polymerize the elastomer precursor compound to form an elastomer and/or to harden the elastomer in step c), suitable polymerization initiators or crosslinkers can be supplied. Furthermore, in step c) a suitable temperature for polymerization or hardening can be set and/or the elastomer can be exposed to radiation of a wavelength suitable for hardening.

When the elastomer precursor compound is hardened and/or polymerized to form the elastomer body, the filter element according to the invention is obtained. The elastomer body which is formed in the molding die surrounds the reinforcement element at least in part such that the frame is thus formed. Said frame is simultaneously integrally connected to the filter pocket in the region of the opening by means of the elastomer body.

The method has the advantage that the elastomer body, reinforcement elements and filter pocket can be connected to form a filter element having the above-described advantages in a simple method. The filter elements according to the invention are thus cheaper to produce than other filter elements.

In a preferred embodiment, the filter element is produced in an injection molding method, in particular in a two-step injection molding method. Preferably, the precursor compound for the reinforcement element and the elastomer precursor compound are each introduced in steps a) and b), respectively, by means of injection molding. In this process, the part of the filter pocket comprising the opening therein is first introduced into the molding die. The precursor compound for the reinforcement element is then introduced by means of injection molding. In this process, the precursor compound is injected into the molding die and then hardened and/or polymerized to form the reinforcement element. As early as this stage, a connection between the filter pocket and the reinforcement element is thus preferably established in step a). The elastomer precursor compound is also preferably introduced in step b) by means of injection molding. Overall the filter element can thus be produced in a two-step injection molding method after the filter pocket has been provided. This embodiment is advantageous because the filter element can be produced overall in a relatively simple manner in few method steps.

The invention also relates to various uses of the filter elements disclosed above. The filter elements may be used to filter fluids, in particular gases, in particular the air. The filter elements may be used to remove liquids, in particular water, particles and/or substances that are harmful to health, in particular from air or other gases. In this connection, the filter elements may be used, for example, to filter the air supplied to cabins of tractors for agriculture and forestry and self-propelled sprayers. On account of their high level of fluid tightness and their simple structure, the filter elements can achieve an efficiency of at least 90%, preferably at least 95%, particularly preferably at least 99%, during filtration. Said filter elements thus meet the requirements for category 2 dust filters as per DIN standards EN 15695-1 and EN 15695-2. The filter elements may also be used to filter air that is guided though filtering systems, such as air-conditioning units, heaters, coolers or ventilators, and through vacuum cleaners, air purifiers or other purification apparatuses. The filter elements may also be used to filter the air supplied to engines. The filter elements may also be used in "reverse operation" in relation to the mentioned filtering/removal scenarios. The filter elements may also be used in a method for filtering fluids, in particular air, or a method for removing liquids, in particular water, particles and/or substances that are harmful to health, from air or other gases.

The invention also relates to an apparatus, comprising an above-described filter element and an air-guiding element and/or a filter housing and/or an engine. The fluid to be filtered may flow through the apparatus passively or actively, such as in fans or suction apparatuses. An air-guiding element within the meaning of the present invention may be any structure which guides the flow of air, such as air ducts, pipes, air intake elements in engines, or parts of climate control systems, such as air-conditioning units, heaters, coolers or ventilators.

The filter elements, method and production thereof according to the invention and the uses according to the invention achieve the object of the invention. On account of the integral connection between the frame and the filter pocket by means of the elastomer body, the filter elements have a particularly high level of fluid tightness between the frame and the filter pocket. Furthermore, the connection has a particularly high level of stability and thus prevents the filter pocket from detaching from the frame at high rates of flow of the fluid to be filtered. In comparison with already known filter elements from the prior art, the mentioned advantageous properties relating to fluid tightness and stability can be implemented by means of a simple structure of the filter element according to the invention. An additional seal between the frame and the filter pocket is not required. This makes the filter elements easier to produce and reduces production costs.

The elastic properties of the frame advantageously make it possible to fluid-tightly connect the filter element to the mating piece thereof, such as a filter housing, in a highly fluid-tight manner. Filter elements from the prior art typically need an additional elastic seal element between the filter element and the filter housing to ensure a fluid-tight connection at this junction. In the case of the filter elements according to the invention, said additional seal can also be dispensed with at said junction. This simplifies in particular the final assembly of the filter elements.

The above-mentioned advantages are in particular achieved if polyurethanes are used in the elastomer body as they have good elastic properties, good adhesive properties for integrally connecting the elements of the pocket filter, and good moldability.

Since, in the filter elements according to the invention, the filter pocket is prevented from collapsing at low rates of flow, the entire area of the filter pocket can advantageously also be utilized for filtration in these conditions. In this respect, effective filtration is ensured, and the filtered substances are prevented from being deposited unevenly in the filter material. Furthermore, the spacer elements preventing the filter pocket from collapsing makes it possible to even use the filter elements in "reverse operation". As a result of the formation of the frame and the spacer elements in one piece, this additional functionality of the filter element can be achieved without additional production or assembly steps.

The filter elements according to the invention can be assembled in few steps in the method according to the invention. This makes it possible to provide to provide the filter elements having the above-described advantageous properties by means of a comparatively cost-effective production method.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A filter element, comprising:
   a frame comprising a peripheral elastomer body and a reinforcement element embedded in the elastomer body; and
   a filter pocket having an opening,
   wherein the frame is connected to the filter pocket at the opening,
   wherein the elastomer body contacts the reinforcement element and the filter pocket at the opening and surrounds the reinforcement element and the filter pocket at the opening,
   wherein the reinforcement element reinforces the frame in a plane of the opening, wherein an outer periphery of the reinforcement element corresponds to a shape of the frame, and wherein the frame and the reinforcement element extend around a periphery of the opening.

2. The filter element according to claim 1, wherein the elastomer body is molded on the filter pocket.

3. The filter element according to claim 1, wherein the elastomer body contains at least one polyurethane.

4. The filter element according to claim 1, wherein the elastomer contained in the elastomer body has a Shore A hardness of from 10 to 50.

5. The filter element according to claim 1, wherein the frame comprises at least one spacer element, which prevents the opposite walls of the filter pocket from touching one another.

6. The filter element according to claim 5, wherein the spacer element and the reinforcement element comprises one piece or are formed integrally or are interlockingly interconnected.

7. The filter element according to claim 1, wherein the elastomer body at least in part comprises a peripheral sealing lip.

8. The filter element according to claim 1, wherein the reinforcement element contains at least one metal and/or at least one thermoplastic and/or at least one thermosetting plastic.

9. The filter element according to claim 1, wherein the filter pocket comprises at least one nonwoven.

10. A method for producing the filter element according to claim 1, the method comprising the steps of:
   a) introducing part of the filter pocket comprising the opening therein, and introducing the reinforcement element or a precursor compound for the reinforcement element, into a molding die;
   b) introducing at least one elastomer precursor compound into the molding die;
   c) hardening and/or polymerizing the elastomer precursor compound so as to form the elastomer body, which, together with the reinforcement element, thus forms the frame, which is integrally connected to the filter pocket by the elastomer body.

11. The method according to claim 10, wherein the precursor compound for the reinforcement element and the elastomer precursor compound are each introduced in steps a) and b), respectively, by injection molding.

12. A method of using a filter element according to claim 1 comprising removing at least one of water droplets, dust, fertilizers, herbicides, or insecticides from air.

13. A method of using a filter element according to claim 1 for filtering air, comprising flowing air through the filter element from a closed end of the filter pocket towards an open end of the filter pocket.

14. The filter element according to claim 1, further comprising:
   an air-guiding element.

15. The method according to claim 10, wherein after step a), the method further comprises hardening and/or polymerizing the precursor compound so as to form the reinforcement element.

16. A filter element, comprising:
   a frame comprising a peripheral elastomer body and a reinforcement element embedded in the elastomer body; and
   a filter pocket having an opening,
   wherein the frame is connected to the filter pocket at the opening,
   wherein the elastomer body contacts the reinforcement element and the filter pocket at the opening and surrounds the reinforcement element and the filter pocket at the opening, and
   wherein the frame comprises at least one spacer element, which prevents the opposite walls of the filter pocket from touching one another.

17. The filter element according to claim 16, wherein the spacer element and the reinforcement element comprises one piece or are formed integrally or are interlockingly interconnected.

18. A filter element, comprising:
   a frame comprising a peripheral elastomer body and a reinforcement element embedded in the elastomer body; and
   a filter pocket having an opening,
   wherein the frame is connected to the filter pocket at the opening,
   wherein the elastomer body contacts the reinforcement element and the filter pocket at the opening and surrounds the reinforcement element and the filter pocket at the opening,
   wherein the reinforcement element reinforces the frame in a plane of the opening,
   wherein an outer periphery of the reinforcement element corresponds to a shape of the frame,
   wherein the frame and the reinforcement element extend around a periphery of the opening,
   wherein the frame comprises at least one spacer element, which prevents the opposite walls of the filter pocket from touching one another,
   wherein the spacer element connects two opposite sides or two corners of the frame, and
   wherein the spacer element is foldable.

19. A filter element, comprising:
   a frame comprising a peripheral elastomer body and a reinforcement element embedded in the elastomer body; and
   a filter pocket having an opening,
   wherein the frame is connected to the filter pocket at the opening,
   wherein the elastomer body contacts the reinforcement element and the filter pocket at the opening and surrounds the reinforcement element and the filter pocket at the opening,
   wherein the frame comprises at least one spacer element, which prevents the opposite walls of the filter pocket from touching one another,
   wherein the spacer element connects two opposite sides or two corners of the frame, and
   wherein the spacer element is foldable.

* * * * *